United States Patent [19]
Wolf

[11] Patent Number: 5,497,809
[45] Date of Patent: Mar. 12, 1996

[54] VENTED BENDING SLEEVES FOR COAXIAL TUBING SYSTEMS

[76] Inventor: Lawrence W. Wolf, 3901 Dixie Hwy. NE., Unit 505, Palm Bay, Fla. 32905

[21] Appl. No.: 177,443

[22] Filed: Jan. 5, 1994

[51] Int. Cl.$^6$ ........................................ F16L 9/18
[52] U.S. Cl. .................... 138/113; 138/114; 138/148; 138/DIG. 3; 138/DIG. 8
[58] Field of Search .................... 138/113, 114, 138/DIG. 3, DIG. 8, 112, 108, 156, 151, 167, 169, 148; 29/890.036, 455.1, 33 D, DIG. 3; 72/369, 370, 701; 24/555

[56] References Cited

U.S. PATENT DOCUMENTS

| | | | |
|---|---|---|---|
| 2,153,787 | 4/1939 | Anderson | 138/114 X |
| 2,440,245 | 4/1948 | Cheuigny | 138/114 X |
| 2,821,092 | 1/1958 | Cordora et al. | 138/DIG. 3 X |
| 3,253,326 | 5/1966 | Henry et al. | 138/114 |
| 3,642,308 | 2/1972 | Zeile et al. | 285/47 |
| 4,215,727 | 8/1980 | ter Wijlen | 138/113 X |
| 4,240,850 | 12/1980 | Arntz | 138/114 X |
| 4,274,549 | 6/1981 | Germain | 220/86 R |
| 4,283,448 | 8/1981 | Bowman | 138/DIG. 3 X |
| 4,691,741 | 9/1987 | Affa et al. | 138/113 |
| 4,756,339 | 7/1988 | Buluschek | 138/148 X |
| 5,018,260 | 5/1991 | Ziu | 24/555 |
| 5,069,255 | 12/1991 | Muszynski | 138/113 X |
| 5,127,441 | 7/1992 | Rains | 138/114 |

FOREIGN PATENT DOCUMENTS

| | | | |
|---|---|---|---|
| 2915838 | 10/1980 | Germany | F16L 9/18 |

Primary Examiner—David Scherbel
Assistant Examiner—James F. Hook
Attorney, Agent, or Firm—Kenneth P. Robinson

[57] ABSTRACT

Coaxial tubing systems incorporate bending sleeves of insoluble, compression resistant material with cold flow characteristics. Bending sleeves of length coextensive with a bend are dimensioned to substantially fill the annular space between inner and outer coaxial tubes, while also providing longitudinal fluid passageways between the tubes. Such bending sleeves are effective to enable bending of coaxial tubing systems by (a) transmitting bending forces to, from and between inner and outer tubes during bending, (b) restricting tube collapse, wrinkling and deformation during bending, and (c) maintaining spacing between inner and outer tubes after bending and limiting inner tube vibration, while (d) providing fluid passageways between the tubes for leak containment, leak detection, heating, heat dissipation and other auxiliary fluid flow purposes. Conductive spacers are provided for maintaining annular tube spacing, particularly at tube ends, and for enabling electrical grounding of the inner tube.

27 Claims, 4 Drawing Sheets

VENTED BENDING SLEEVES FOR COAXIAL TUBING SYSTEMS

This invention relates to coaxial tubing systems and, more particularly, to bending sleeves enabling reliable bends to be provided in coaxial tubes by (a) transmitting bending forces to and from inner and outer tubes during bending, (b) restricting tube collapse and deformation during bending, and (c) maintaining spacing between inner and outer tubes after bending, while (d) providing venting via a fluid passageway between the tubes.

BACKGROUND OF THE INVENTION

In many applications in which tubes, pipes or conduits are arranged to enable a fluid to flow from one point to another, there is a concern about the occurrence of leaks at some joint or other unattended point. While such a leak in a water pipe may be of little concern, fuel leaks or leaks of some other fluid may result in a potentially dangerous situation or area contamination. In the latter class of applications, it may be desirable to provide some type of coaxial sleeve or shroud intended to contain any leaking fluid. However, known prior arrangements for this purpose have generally been subject to disadvantages such as large size, high cost, difficult in situ assembly, limited adaptability and low reliability.

For example, in passenger aircraft applications potential leaks in fuel lines linking fuel storage tanks to the engines represent a significant safety problem. In view of this, safety regulations require provision of some form of secondary barrier for leak containment, particularly at fuel line joints and fuel line runs in passenger and fire hazard areas of the aircraft. In the past, such secondary barriers have taken the form of metal or rubber shrouds significantly larger than the fuel line, which are assembled around the fuel line at the time of its installation in the aircraft.

Where rigid metal fuel lines are used with assembled joint components to accommodate changes in fuel line direction, the shroud diameter must be significantly larger than the fuel line and joint components. This is necessary in order to enable assembly of the joint and assembly of a rigid shroud or positioning of a flexible shroud over the line and joint in the aircraft. Where flexible fuel lines are used, large diameter shrouds are typically required to enable assembly over fuel line bends of relatively large bend radius. In some applications, shroud sections are installed so as to cover only a joint section of the fuel line. While this may make in-aircraft fuel line and shroud assembly somewhat easier, seal assemblies are then required at each end of the shroud assembly. An attribute of many of these fuel line enclosure approaches is the difficulty of adequately supporting the fuel line within the shroud assembly and of providing adequate electrical grounding between the fuel line and the shroud, where required. As a result, the fuel line may be able to move laterally or experience significant vibration in the environment of an operational aircraft.

Other fluid flow applications may represent less dangerous conditions, but may involve the problem of area contamination. Thus, for example, in a clean room application for electronic assembly, chemical, biological or other use, a leak in a supply tube or pipe may represent a very disruptive risk, so that a practical, reliable and economical arrangement for leak containment is highly desirable. In these and other applications a secondary objective may be to enable actual monitoring and recovery of any fluid which does leak from the supply tube or pipe. This permits both identification of the presence of such a leak and avoidance of a buildup of fluid which has leaked under supply conditions typically involving some degree of pressurization.

Coaxial piping systems have been proposed in order to address some of the considerations discussed above. Rigid pipe systems can be provided using welds or connector assemblies at joints and corners, with some form of spacer inserted to preserve spacing between inner and outer pipe sections. Also, various forms of spacing protrudances can be provided on one or the other hose of a coaxial system utilizing two flexible rubber hoses. At the same time, even though a tubing system using coaxial metal tubes of bendable aluminum, for example, would provide significant advantages of light weight, reliability, long life and small size, so far as is known no practical such system has been available for applications of this type. A basic reason for such unavailability has been the very real problem of how to bend two metal tubes arranged coaxially, without the collapse or severe deformation of one tube or the other. It is also generally desirable to avoid having the inner tube forced against the outer tube during bending. Spacers can be inserted between the tubes, but have generally been unsatisfactory for maintaining structural integrity of the tube during the bending process. While equipment and methods have been available for maintaining structural integrity of a single tube while enabling it to be bent, such approaches have not been relevant to the problem of simultaneously maintaining structural integrity of the inner and outer tubes during the bending of two coaxial tubes.

It is therefore an object of this invention to provide coaxial tubing systems, including a bending sleeve inserted between inner and outer tubes which enables the inner and outer tubes to be bent simultaneously while maintaining structural integrity of both tubes.

An additional object is to provide bending sleeves, for coaxial tubing systems, which are effective to transmit bending forces to and from inner and outer tubes so as to limit tube collapse and deformation, and to maintain annular spacing between the tubes. A further object is to provide such bending sleeves which also encompass one or more longitudinal fluid passageways between the inner and outer tubes.

Other objects are to provide methods for bending a coaxial tubing system while avoiding tubing collapse and to provide new and improved coaxial tubing systems, bending sleeves and bending methods which avoid one or more of the shortcomings or disadvantages of prior coaxial systems and bending methods.

SUMMARY OF THE INVENTION

In accordance with the invention, a coaxial tubing system, having at least one bend, includes an outer tube having a cross-sectional inner dimension and having a curved portion and an inner tube, having a cross-sectional outer dimension, disposed within said outer tube and having a curved portion substantially coextensive with said curved portion of said outer tube. Bending sleeve means, disposed between the inner and outer tubes at such bend and having a length at least coextensive with said curved portions of the tubes, are provided (a) for transmitting bending forces between the outer and inner tubes when the outer tube is subjected to bending, (b) for restricting collapse and limiting deformation of the inner and outer tubes during bending and (c) for maintaining annular spacing between the inner and outer tubes after bending. For these purposes, the bending sleeve means comprises a structural member including the following. Inner means, having a nominal in-use inner dimension incrementally larger than the outer dimension of the inner tube, are provided for enabling the bending sleeve means to be positioned around a to-be-bent portion of the inner tube. Outer means, having a nominal in-use outer dimension incrementally smaller than the inner dimension of the outer tube, are provided for enabling the inner tube with the bending sleeve means positioned around it to be placed within a to-be-bent portion of the outer tube. Fluid passage means are included for providing a longitudinal fluid passageway between said inner and outer tubes. Such outer and inner means may each comprise a circular portion of the structural member and the fluid passage means have the form of at least one opening extending longitudinally through the structural member between its inner and outer surfaces. The structural member may also include a longitudinal cut extending radially through such member from its center outward.

Also in accordance with the invention, a method for bending a coaxial tubing system, while avoiding tubing collapse, includes the steps of:

(a) forming a sleeve of compression resistant material having a cold flow capability during bending, having a thickness incrementally smaller than the annular spacing between an outer tube and an inner tube and having at least one radially discontinuous area forming a longitudinal fluid passageway, the sleeve being dimensioned for placement within the outer tube;

(b) selecting a portion of the outer tube at which bending is to occur;

(c) identifying the portion of the inner tube which is to be placed inside the outer tube substantially coextensive with the portion of the outer tube selected in step (b);

(d) placing around the portion of the inner tube identified in step (c) a portion of the sleeve formed in step (a) which has length substantially coextensive with such portion of the outer tube;

(e) placing the sleeve portion/inner tube combination formed in step (d) within the portion of the outer tube to form a coaxial tubing system; and (f) bending the coaxial tubing system formed in step (e) by applying bending force to the outer tube so that such bending force is transmitted between the inner and outer tubes, by the sleeve portion, without collapse of the outer tube or the inner tube.

For a better understanding of the invention, together with other and further objects, reference is made to the following description taken in conjunction with the accompanying drawings and the scope of the invention will be pointed out in the accompanying claims.

DESCRIPTION OF THE INVENTION

Figures 1, 2A, 2B:
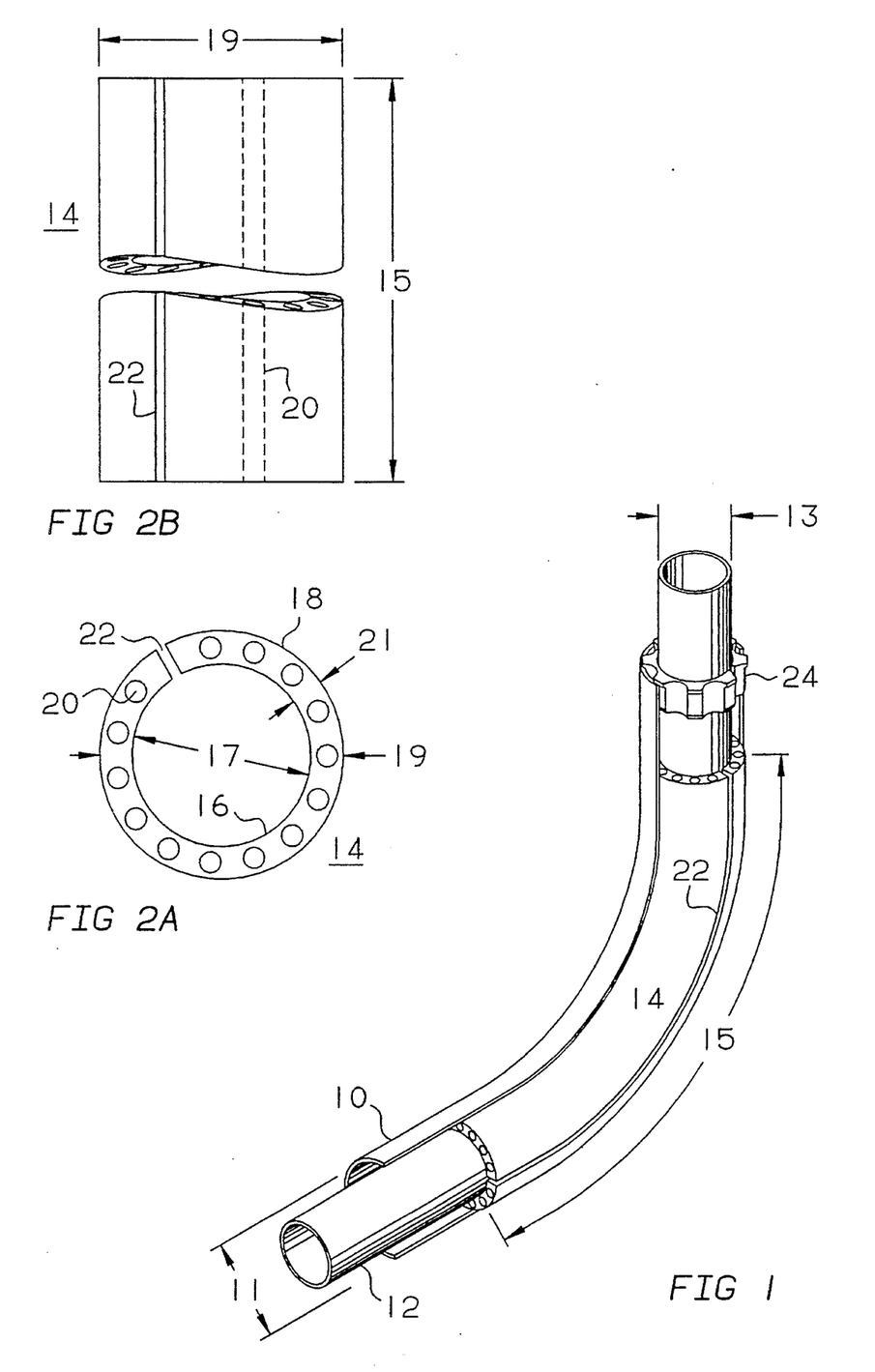
FIG. 1 illustrates a coaxial tubing system utilizing a bending sleeve in accordance with the invention.
FIGS. 2A and 2B show details of the FIG. 1 bending sleeve.

Referring now to FIG. 1, there is shown a portion of a coaxial tubing system having a bend. As illustrated, the FIG. 1 tubing system includes an outer tube 10 having a cross-sectional inner dimension, shown as inner diameter 11, and a curved portion as visible in the drawing. In FIG. 1 a portion of the right side of tube 10 has been removed for illustrative purposes. Inner tube 12 has a cross-sectional outer dimension, shown as outer diameter 13, and is disposed within the outer tube 10. As illustrated, inner tube 12 has a curved portion which is substantially coextensive with the curved portion of outer tube 10. Tubes 10 and 12 may typically be tubes of aluminum or other material of circular cross section, providing desired attributes of strength and weight.

The FIG. 1 coaxial tubing system also includes bending sleeve means, shown as bending sleeve 14, disposed between the inner tube 12 and outer tube 10 at the bend in the tubing system and having a length 15 which is at least coextensive with the curved portions of tubes 10 and 12. As will be further discussed, the bending sleeve means 14 is configured and has characteristics effective: (a) for transmitting bending forces to, from and between the inner tube 12 and the outer tube 10 when outer tube 10 is subjected to bending, (b) for restricting collapse and limiting deformation of the tubes during bending, and (c) for maintaining annular spacing between tubes 12 and 10 after bending, when the tubes and bending sleeve have the configuration illustrated in FIG. 1.

The bending sleeve means of FIG. 1 comprises a structural member shown in greater detail in the respective end and side views of FIGS. 2A and 2B, which are drawn to a larger scale than FIG. 1. As shown in these drawings, the structural member 14, which may be formed of extruded polymer-type material, such as "TEFLON", is comprised of a plurality of component functional means arranged in a cooperating combination. Inner means comprise the inner portion 16 having a nominal in-use inner dimension, shown as diameter 17, which is incrementally larger than the outer dimension 13 of the inner tube 12. This dimensioning enables the bending sleeve to be positioned around a to-be-bent portion of inner tube 12 prior to said to-be-bent portion of tube 12 being placed within outer tube 10. The actual dimensional difference between the outer dimension 13 and the in-use inner dimension 17 is determined as suitable in particular applications. Thus, such difference may be effective to provide a frictional fit so that sleeve 14 remains in the position at which it is placed around tube 12, or may be larger so that sleeve 14 slips readily and is held in place by thermal shrinking of sleeve 14, by annular retainer bands which grip tube 12 at the ends of sleeve 14, or by other arrangements.

Outer means of the structural member 14 comprise the outer portion 18 having a nominal in-use outer dimension, shown as diameter 19 in FIG. 2A, which is incrementally smaller than the inner dimension 11 of outer tube 10. this dimensioning enables the inner tube 12, with bending sleeve 14 positioned around it, to be placed within a to-be-bent portion of the outer tube 10. The actual dimensional difference between the in-use outer dimension 19 and inner dimension 11 is typically determined so that with bending sleeve 14 around inner tube 12 there will still be adequate clearance to permit the inner tube/bending sleeve combination to readily slide into outer tube 10, while leaving only a small tolerance between dimensions 19 and 11. The actual dimensions and tolerances can be determined as suitable in particular applications.

Fluid passage means of the structural member 14 comprise one or more holes indicated typically at 20 in FIG. 2A, and a representative one of which is shown dotted in FIG. 2B, in this embodiment. The fluid passage holes 20, are arranged to provide fluid passageways longitudinally between the inner and outer tubes 12 and 10, to provide venting of the system. It will thus be seen that the outer and inner means each comprise a circular portion of the structural member 14, which has a thickness 21 between its inner and outer surfaces, and the fluid passage holes 20 extend longitudinally between those surfaces in this embodiment.

An additional feature of the invention, which may be incorporated in this embodiment, is a longitudinal cut 22 which extends radially through structural member 14 from its center outward. In an extruded form of bending sleeve, cut 22 may, for example, be formed during the extrusion process or may be implemented by a cutting action following extrusion. Cut 22 permits the structural member 14 to be produced in a form having an actual inner dimension 17 which is smaller than outer dimension 13 of tube 12. This enables the member 14 to be spread apart at cut 22 adequately to permit positioning around tube 12. Subsequent contraction, resulting from shape retention characteristics, provides a gripping action adequate to hold member 14 in place around tube 12. Thus, while in the longitudinally cut form of the bending sleeve 14 the original inner dimension 17 may be smaller than dimension 13, nevertheless the in-use inner dimension of bending sleeve 14 will necessarily be incrementally larger than dimension 13. In view of this, for purposes of the specification and claims, the term "in-use dimension" (inner or outer) is defined as the dimension the relevant means or element will have when positioned in place around a tube or in a coaxial tubing system.

The FIG. 1 coaxial tubing system also includes grounding spacer means, shown as metallic spacer 24, disposed between the inner and outer tubes 12 and 10. Spacer 24, which is positioned at a terminus of outer tube 10 at a point which may be near to or far removed from the position of bending sleeve 14, serves to provide electrical grounding or interconnection between tubes 10 and 12, and serves to maintain annular spacing between the tubes and prevent vibration of inner tube 12. Spacer 24, shown in greater detail in FIG. 3, also includes indentations, as indicated at 26, which provide fluid passages longitudinal to the tubes. Spacer 24 may be formed of aluminum or other appropriate conductive material. In the FIG. 3 embodiment, spacer 24 is shown as including stop tabs 28 which extend radially outward to prevent spacer 24 from slipping to a position totally within tube 10. In other embodiments such stop tabs may be omitted. Spacer 24 may be formed of non-conductive material for use in applications in which electrical connection to or grounding of the inner tube is not desired.

Figures 3, 4, 5A, 5B:
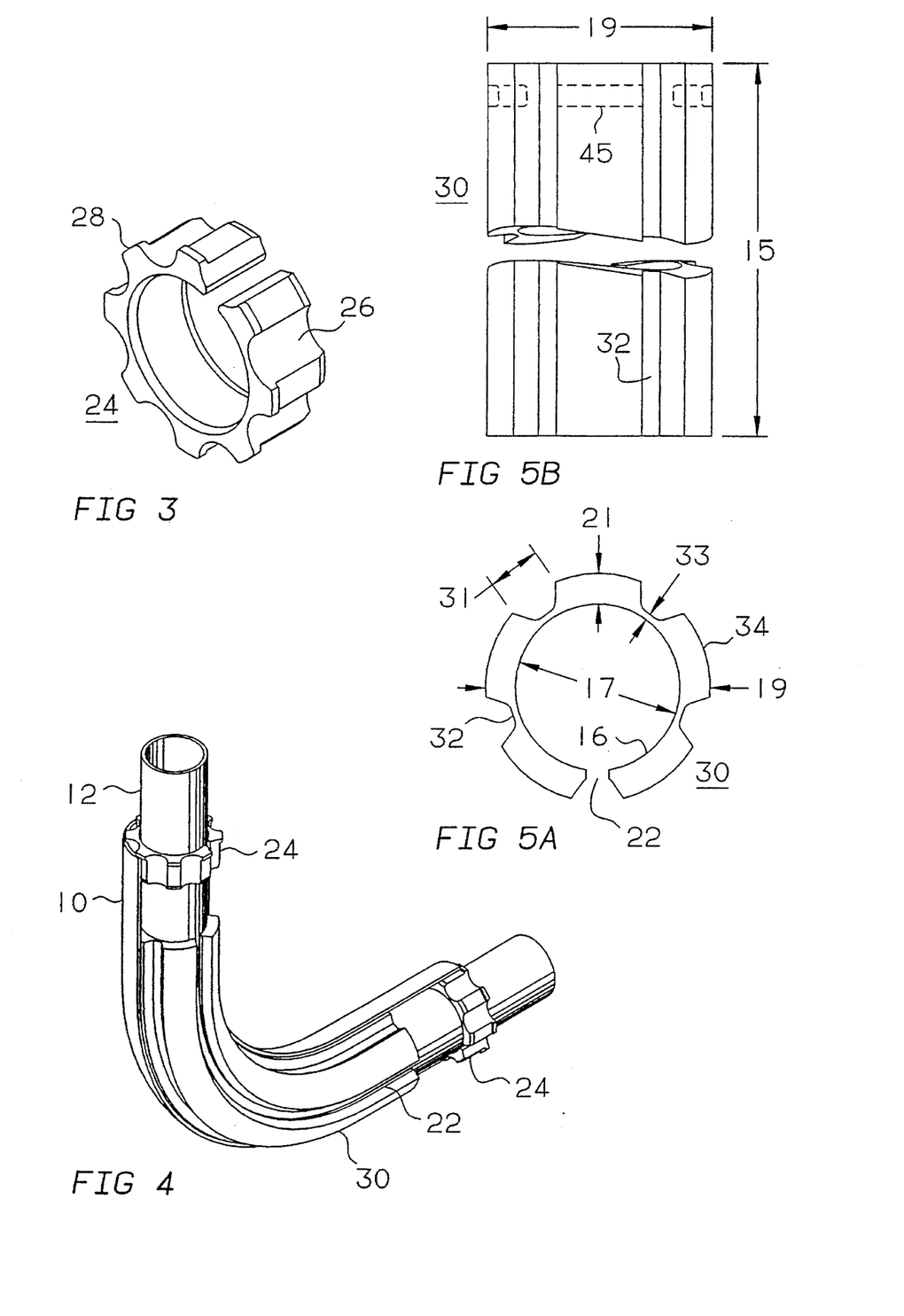
FIG. 3 shows a conductive spacer for use in tubing systems in accordance with the invention.
FIGS. 4, 5A and 5B illustrate a second embodiment of the invention.
Figure 6A:
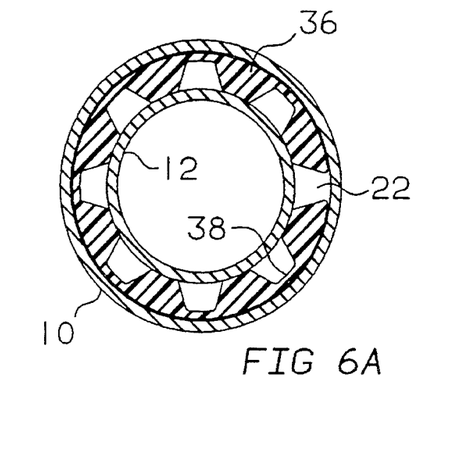
FIGS. 6A, 6B, 7A, 7B, 8A, 8B, 9A and 9B are cross-sectional views of coaxial tubing systems using other forms of bending sleeves.
Figure 6B:
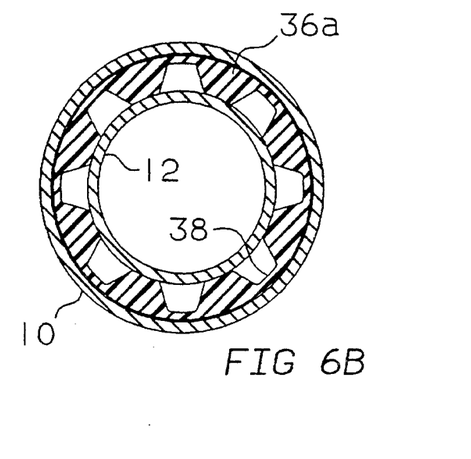
Figure 7A:
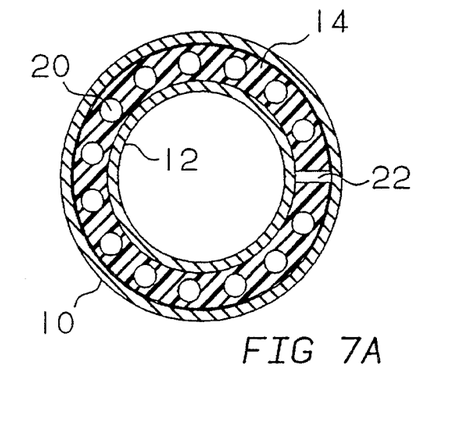
Figure 7B:
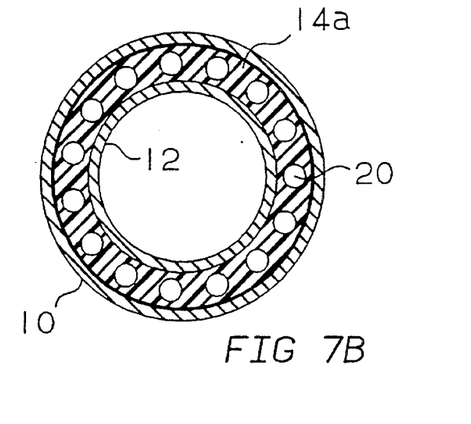
Figure 8A:
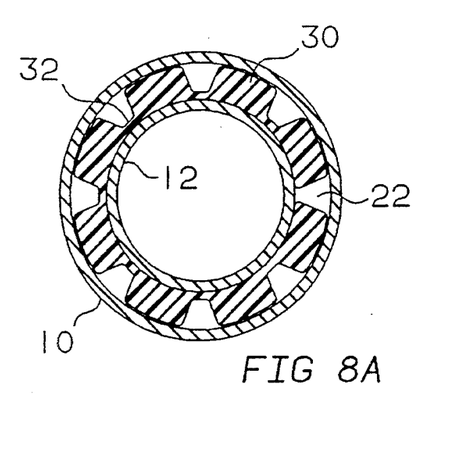
Figure 8B:
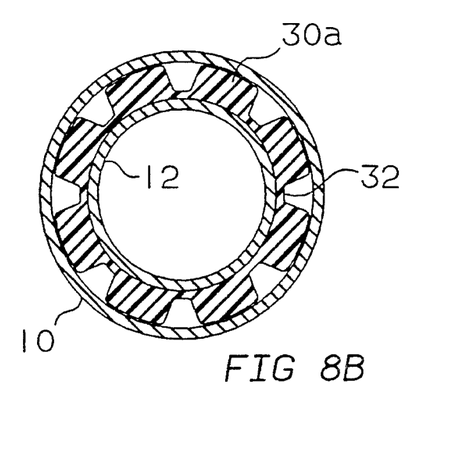
Figure 9A:
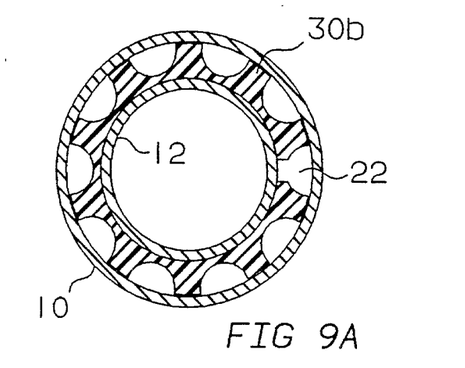
Figure 9B:
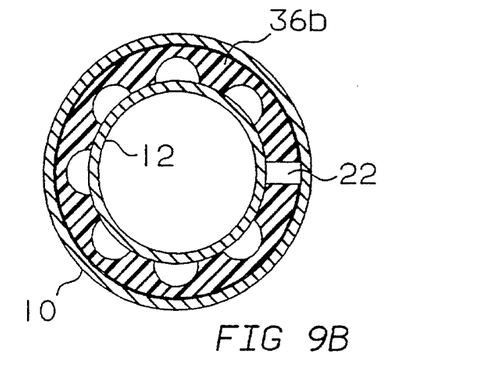

With reference now to FIGS. 4, 5A and 5B, there is illustrated a coaxial tubing system utilizing a different embodiment of a bending sleeve in accordance with the invention. As shown in the end view of FIG. 5A, in this embodiment bending sleeve 30, for facilitating a bend in a coaxial tubing system, includes inner means 16 having a nominal in-use dimension 17, which is the diameter of a circle. However, there are no holes longitudinally through the constituent material of the bending sleeve. Instead, fluid passage means comprise a plurality of spaced-apart portions 34 embodied as outer means cross-sectionally configured to lie on a circle and one or more indented areas as shown at 32. Indented areas 32 are effective to provide longitudinal fluid passageways between the inner and outer tubes in the assembled tube system shown in FIG. 4 with a portion of outer tube 10 removed for illustration. As illustrated, bending sleeve 30 includes four indented areas 32, each of which has a nominal width 31 and a depth leaving a nominal thickness 33 within each indented area 32. Bending sleeve 30, which is shown in side view in FIG. 5B, functions in the same manner as the FIG. 1 embodiment.

Referring now to the various views of FIGS. 6 through 9, there are illustrated end views of coaxial tubing systems incorporating different embodiments of bending sleeves in accordance with the invention. FIGS. 6A and 6B, FIGS. 7A and 7B, and FIGS. 8A and 8B respectively show split and unsplit versions of bending sleeves 36, 14 and 30. Bending sleeves 14 and 30 include longitudinal holes 20 and indentations 32 of the same types as respectively shown in and discussed with reference to FIGS. 2A and 5A. Bending sleeves 36 and 36a in FIGS. 6A and 6B include indentations 38 formed and dimensioned so that the inner means, in both the cut and circumferentially continuous versions, comprises a plurality of spaced-apart portions cross-sectionally configured to lie on a circle around the outer circumference of tube 12, as shown. This is contrasted to the bending sleeves 30 and 30a in FIGS. 8A and 8B, the outer means of which include spaced-apart portions (between indentations 32) cross-sectionally configured to lie on a circle which is incrementally smaller than the inner diameter of outer tube 10. FIGS. 9A and 9B respectively show bending sleeve types 30b and 36b having outwardly extending and inwardly extending portions separated by indentations of half-cylindrical form providing the desired longitudinal fluid passageways between the inner and outer tubes 12 and 10. The embodiments shown are illustrative of the many possible configurations which can be provided by skilled individuals in particular applications.

Figures 10A, 10C:
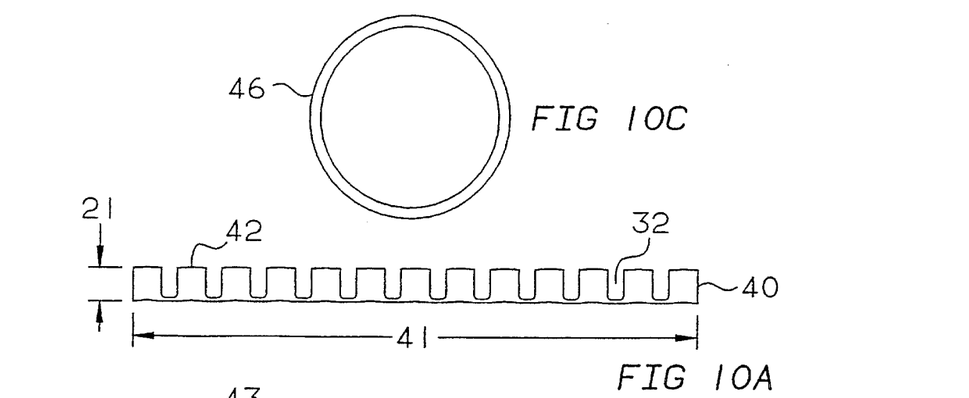
FIGS. 10A, 10B, 10C, 11A, 11B and 12 illustrate use of bending sleeves formed of planar stock material produced in accordance with the invention.
Figure 10B:
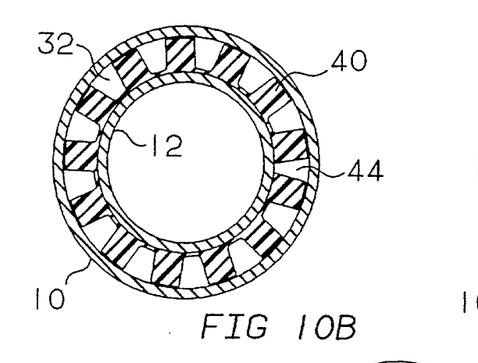

FIG. 10A illustrates a bending sleeve 40 which comprises a section of material of basically planar form having a length normal to the surface of the drawing as specified with reference to length 15 in FIG. 1 and a width 41 having a predetermined relation to the outer dimension of the inner tube 12. As represented in FIG. 10B, width 41 may desirably be somewhat smaller than the distance represented by the outer circumference of tube 12 so as to leave a gap 44, corresponding to cut 22 discussed earlier. Indentations 32 are included to provide longitudinal fluid passageways, as previously discussed. Bending sleeve 40 additionally has a thickness 21 which is smaller than the difference between the inner diameter of outer tube 10 and the outer diameter of inner tube 12. The spaced-apart portions of bending sleeve 40 may desirably be formed with convex curved upper extremities as indicated at 42. With this dimensioning, bending sleeve 40 as shown in FIG. 10A is capable of being formed into the substantially annular shape shown in FIG. 10B for positioning around inner tube 12 and permitting tube 12 with sleeve 40 around it to be inserted within outer tube 10. When formed into such annular shape, it will be appreciated that in side view the bending sleeve 40 will resemble the FIG. 5B side view of sleeve 30. By specifying the curvature of the upper extremities at 42 to correspond to the curvature of the inside surface of outer tube 10, as shown in FIG. 10B, an improved operative combination can be achieved. As represented in dashed form at 45 in FIG. 5A, bending sleeve 40 may include laterally extending grooves suitable for receiving one or more elastic rings 46, such as shown in FIG. 10C, which can be positioned to encircle the formerly planar section of material 40 which has been formed into annular shape as shown in FIG. 10B. The elastic rings such as 46 are thus effective to help maintain the substantially annular shape during assembly.

Figure 11A:
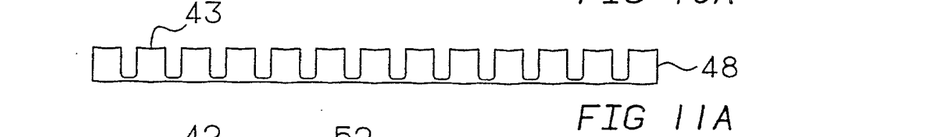
Figure 11B:
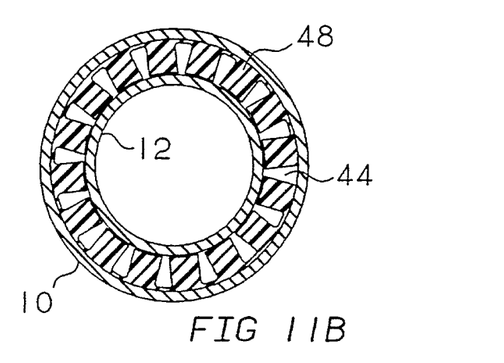
Figure 12:
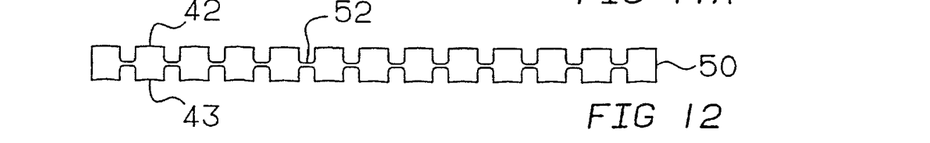

FIG. 11A illustrates an alternative form of material section 48 in order to indicate the variety of planar type embodiments which may be provided for different applications. FIG. 11B shows section 48 in place in a coaxial tubing system including inner and outer tubes 12 and 10. In this embodiment the upper extremities of the spaced-apart portions of bending sleeve 48 are formed with concave shaping as indicated at 43. The curvature at 43 desirably corresponds to the outside surface of inner tube 12, as illustrated in FIG. 11B. FIG. 12 shows an additional configuration in the form of bending sleeve 50. Sleeve 50 comprises a section of material of basically planar form corresponding generally to sleeve sections 40 and 48, but having spaced apart portions extending upward and downward from intermediate interconnecting portions 52. As shown in FIG. 12, the upward extending portions have convex curved upper extremities, as indicated at 42, and the downward extending portions have concave curved extremities, as indicated at 43. Bending sleeve 50 can thus be positioned between outer tube 10 and inner tube 12, in the manner of sleeve 48 in FIG. 11B, with curvatures of 42 and 43 of bending sleeve 50 corresponding to the inner and outer diameters of tubes 10 and 12, respectively. With knowledge of the invention, particular configurations of bending sleeves of these types, with flat or curved extremities, can be specified as appropriate in particular applications.

In accordance with the invention, a method for bending a coaxial tubing system, while avoiding collapse of either of the tubes, comprises the following steps (see the configuration shown in FIGS. 1, 2A and 2B).

(a) Form sleeve 14 of compression resistant material having a cold flow capability during bending, having a thickness 21 incrementally smaller than the annular between an outer tube 10 and an inner tube 12, and having at least one radially discontinuous area forming a longitudinal fluid passageway. Thus, the holes 20 extend longitudinally and represent radial discontinuities between the inner and outer surfaces of sleeve 14. By forming sleeve 14 from polytetrafluoroethylene as its constituent material, sleeve 14 is imbued with self-lubricating and cold flow characteristics which permit stretching and compression of various portions of the walls of the inner and outer tubes 10 and 12, while preventing collapse or wrinkling of the tubes and limiting tube deformation.

(b) Select a portion of outer tube 10 at which bending is to occur. This may be the portion of tube 10 in FIG. 1 which is coextensive with, but somewhat shorter than, the length 15 of sleeve 14.

(c) Identify the portion of inner tube 12 which is to be placed inside the outer tube 10 substantially coextensive with the portion of tube 10 selected in step (b).

(d) Place around the step (c) portion of tube 12 a portion 14 of the sleeve formed in step (a) which has a length substantially coextensive with the portion of tube 10 selected in step (b). This portion of sleeve 14 has a length 15 as indicated in FIG. 1, which may desirably extend about one-half inch past bent portions of the tubes after bending of tubes whose diameter is of the order of one inch. At this point, the sleeve may be retained in place on tube 12 by friction, restrictive heat treatment, clamping devices placed around the sleeve or around tube 12 at the ends of sleeve 14, etc., as appropriate in the particular application.

(e) Place the sleeve portion/inner tube combination 14/12 formed in step (d) within the selected portion of tube 10 to form a coaxial tubing system.

(f) Bend the coaxial tubing system formed in step (e) by applying bending force to outer tube 10 so that bending force is transmitted to, from and between tubes 12 and 10, by sleeve portion 14.

It will be appreciated that if no bending sleeve is used, or if some intermediate means lacking the properties and construction of sleeve 14 is used, bending of inner and outer tubes 12 and 10 cannot be controlled as desired, so that tube collapse, wrinkling or deformation can be expected. Also, no longitudinal fluid passageway will be available.

As an alternative to the above method, steps (d) and (e) can be respectively replaced by the following steps:

first, place the portion of inner tube 12 identified in step (c) within the identified portion of outer tube 10; and then, insert between tubes 12 and 10 a portion 14 of the sleeve formed in step (a) which has a length substantially coextensive with the selected portion of tube 10 (e.g., length 15) and move sleeve portion 14 to a position in which it is substantially coextensive with the referenced portions of tubes 12 and 10. The desired movement of sleeve portion 14 to the appropriate position can be readily accomplished by use of a suitable plastic or other non-scratching assembly tube of dimensions enabling it to easily fit between the inner and outer tubes. The assembly tube is used to push the sleeve portion to its desired location and is then removed.

These methods are suitable for assembly and bending coaxial tubing systems including two tubes (or three or more coaxial tubes with two or more suitable bending sleeves). Available types of tube bending mandrels, assemblies, machines and procedures can be utilized or adapted to perform actual bending. Skilled persons will be capable of readily making any modifications in prior hardware and techniques as appropriate. For example, increased bending resistance will be encountered in bending coaxial tubing systems, as compared to single tubes.

Spacer means, such as grounding spacer 24 shown in FIG. 3, may typically be installed before bending. Such spacers are effective to maintain desired annular spacing between tubes 10 and 12 and to provide an inner tube electrical grounding capability. Spacers having a split ring configuration as shown in FIG. 3 can be designed to be held in place by a constricting action around the inner tube after installation. Even without such action, a non-split spacer slightly larger in inner diameter than inner tube 12 will be held in place by the lateral biasing force required to move and hold inner tube 12 to a centered position within tube 10 against the springback force present after bending has taken place.

In application of the invention numerous alternative embodiments and variations will be apparent. Thus, the longitudinal fluid passageways may be spirally longitudinal from one end of the bending sleeve to the other, rather than extending in a direction strictly normal to the cross-sectional diameter as illustrated. Sections of bending sleeve may be used simply as spacers in tube runs between bends, while still providing desired fluid passageways. The between-tube fluid passageways are usable as an additional fluid carrying conduit and it may be desirable to provide for monitoring of the presence in such fluid of contamination, in order to permit early identification of a leak in the wall of the inner tube. Also, the between-tube passageways are usable for introduction of a gas or liquid for cooling or heating of the inner tube 12, or for a return flow conduit. In the latter case fluids may flow in opposite directions within tube 12 and the surrounding fluid passageways. Coaxial bend assemblies using the invention may typically be more economical, half the weight, and more reliable than prior corner joints and shrouds. Also, since the bending sleeve is effectively fixed in place during the bending process, it remains reliably in place after bending, providing support for the inner tube and reducing vibration and possible vibrational fatigue.

While there have been described the presently preferred embodiments of the invention, those skilled in the art will recognize that other and further modifications and variations may be made without departing from the invention. It is therefore intended to claim all such modifications and variations as fall within the scope of the invention.

What is claimed is:

1. A coaxial tubing system, having at least one bend, comprising:

an outer tube having a cross-sectional inner dimension and having a curved portion;

a hollow inner tube suitable for conveying a fluid, said inner tube having a cross-sectional outer dimension, disposed within said outer tube and having a curved portion substantially coextensive with said curved portion of said outer tube; and bending sleeve means, disposed between said inner and outer tubes at said bend and having structural continuity over a length at least coextensive with said curved portions of said inner and outer tubes for transmitting bending forces between said outer and inner tubes when said outer tube is subjected to bending, for restricting collapse and limiting deformation of said inner and outer tubes during bending and for maintaining annular spacing between said inner and outer tubes after bending, said bending sleeve means comprising a hollow cylindrical structural member having:

inner means, having a nominal in-use inner dimension incrementally larger than said outer dimension of said inner tube, for enabling said bending sleeve means to be positioned around a to-be-bent portion of said inner tube;

outer means, having a nominal in-use outer dimension incrementally smaller than said inner dimension of said outer tube, for enabling said inner tube with said bending sleeve means positioned around it to be placed within a to-be-bent portion of said outer tube; and fluid passage means for providing a longitudinal fluid passageway between said inner and outer tubes.

2. A coaxial tubing system as in claim 1, wherein said outer means comprises a plurality of spaced-apart portions cross-sectionally configured to lie on a circle and said inner means comprises a circular portion of said structural member.

3. A coaxial tubing system as in claim 2, wherein said structural member includes a longitudinal cut extending radially through said member from its center outward.

4. A coaxial tubing system as in claim 1, wherein said inner means comprises a plurality of spaced-apart portions cross-sectionally configured to lie on a circle.

5. A coaxial tubing system as in claim 4, wherein said structural member includes a longitudinal cut extending radially through said member from its center outward.

6. A coaxial tubing system as in claim 1, wherein said outer and inner means each comprise a circular portion of said structural member and said fluid passage means comprise at least one opening extending longitudinally through said structural member between its inner and outer surfaces.

7. A coaxial tubing system as in claim 6, wherein said structural member includes a longitudinal cut extending radially through said member from its center outward.

8. A coaxial tubing system as in claim 1, wherein said fluid passage means comprise an opening extending longitudinally through said structural member between its inner and outer surfaces.

9. A coaxial tubing system as in claim 1, wherein said structural member is formed of polytetrafluoroethylene material.

10. A coaxial tubing system as in claim 1, wherein said structural member is formed of material having a property enabling said in-use inner dimension to be adjusted thermally.

11. A coaxial tubing system as in claim 1, additionally comprising grounding spacer means, including a conductive portion disposed between said inner and outer tubes, for conductively intercoupling said inner and outer tubes.

12. A bending sleeve, for facilitating a bend extending over a predetermined longitudinal distance in a coaxial tubing system including an outer tube having a cross-sectional inner dimension and a hollow inner tube suitable for conveying a fluid and having a cross-sectional outer dimension smaller than said inner dimension, said bending sleeve comprising a structural member having an in-use hollow cylindrical form with structural continuity over a length at least equal to said predetermined longitudinal distance and including:

inner means, having a nominal in-use inner dimension incrementally larger than said outer dimension of said inner tube, for enabling said bending sleeve to be positioned around said inner tube and for transmitting bending forces to and from said inner tube;

outer means, having a nominal in-use outer dimension incrementally smaller than said inner dimension of said outer tube, for enabling said inner tube with said bending sleeve positioned around it to be placed within said outer tube and for transmitting bending forces from and to said outer tube;

fluid passage means for providing a longitudinal fluid passageway between said inner and outer tubes; and constituent material means, having a cold flow capability during bending, for transmitting bending forces between said outer and inner tubes when said outer tube is subjected to bending, for restricting collapse and limiting deformation of said inner and outer tubes during bending and for maintaining annular spacing between said inner and outer tubes after bending.

13. A bending sleeve as in claim 12, wherein said outer means comprises a plurality of spaced-apart portions cross-sectionally configured to lie on a circle and said inner means comprises a circular portion of said structural member.

14. A bending sleeve as in claim 13, wherein said structural member includes a longitudinal cut extending radially through said member from its center outward.

15. A bending sleeve as in claim 12, wherein said inner means comprises a plurality of spaced-apart portions cross-sectionally configured to lie on a circle.

16. A bending sleeve as in claim 15, wherein said structural member includes a longitudinal cut extending radially through said member from its center outward.

17. A bending sleeve as in claim 12, wherein said outer and inner means each comprise a circular portion of said structural member and said fluid passage means comprise at least one opening extending longitudinally through said structural member between its inner and outer surfaces.

18. A bending sleeve as in claim 17, wherein said structural member includes a longitudinal cut extending radially through said member from its center outward.

19. A bending sleeve as in claim 12, wherein said fluid passage means comprise an opening extending longitudinally through said structural member between its inner and outer surfaces.

20. A bending sleeve as in claim 12, wherein said constituent material means comprises polytetrafluoroethylene.

21. A bending sleeve as in claim 12, wherein said structural member comprises a section of material of basically planar form having a length as stated, a width having a predetermined relation to the outer dimension of said inner tube, and a thickness smaller than the difference between the inner dimension of said outer tube and the outer dimension of said inner tube, said section of material being capable of being formed into a substantially annular shape providing said nominal in-use inner and outer dimensions for positioning around said inner tube for facilitating a bend.

22. A bending sleeve as in claim 21, additionally comprising at least one elastic ring encircling said section of material so as to maintain said substantially annular shape.

23. A bending sleeve as in claim 21, wherein said fluid passage means comprise indentations separated by spaced-apart portions whose upper extremities have a curvature corresponding to the curvature of a tube surface with which said bending sleeve is to be used.

24. A method for bending a coaxial tubing system, while avoiding tubing collapse, comprising the steps of:

(a) forming a sleeve of compression resistant material having a cold flow capability during bending, having a thickness incrementally smaller than the annular spacing between an outer tube and an inner tube, and having at least one radially discontinuous area forming a longitudinal fluid passageway, said sleeve being dimensioned for placement within said outer tube;

(b) selecting a portion of said outer tube at which bending is to occur;

(c) identifying the portion of said inner tube which is to be placed inside said outer tube substantially coextensive with said portion of said outer tube selected in step (b), said inner tube being hollow and suitable for conveying a fluid;

(d) placing around said portion of said inner tube identified in step (c) a portion of said sleeve formed in step (a) which has an in-use hollow cylindrical form with structural continuity over a length substantially coextensive with said portion of said outer tube;

(e) placing said sleeve portion/inner tube combination formed in step (d) within said portion of said outer tube to form a coaxial tubing system; and (f) bending said coaxial tubing system formed in step (e) by applying bending force to said outer tube so that said bending force is transmitted between said inner and outer tubes, by said sleeve portion, without collapse of said outer tube or said inner tube.

25. A method as in claim 24, wherein said step (a) comprises forming said sleeve of polytetrafluoroethylene material.

26. A method as in claim 24, wherein steps (d) and (e) are respectively replaced with the following steps:

(d) placing said portion of said inner tube identified in step (c) within said portion of said outer tube;

(e) inserting between said inner and outer tubes a portion of said sleeve formed in step (a) which has an in-use hollow cylindrical form with structural continuity over a length substantially coextensive with said portion of said outer tube and moving said sleeve portion to a position in which it is substantially coextensive with said portions of said inner and outer tubes, to form a coaxial tubing system.

27. A method as in claim 24, additionally comprising the step of thermally treating said portion of said sleeve to cause a decrease in a cross-sectional dimension of said sleeve portion effective to retain it in place around said inner tube.

* * * * *